US006772809B2

(12) United States Patent
Puranen

(10) Patent No.: US 6,772,809 B2
(45) Date of Patent: Aug. 10, 2004

(54) KNIFE ASSEMBLY FOR A VENEER LATHE

(75) Inventor: Jussi Puranen, Lahti (FI)

(73) Assignee: Raute Oyj (FI)

( * ) Notice: Subject to any disclaimer, the term of this patent is extended or adjusted under 35 U.S.C. 154(b) by 0 days.

(21) Appl. No.: 10/277,061

(22) Filed: Oct. 22, 2002

(65) Prior Publication Data

US 2003/0075242 A1 Apr. 24, 2003

(30) Foreign Application Priority Data

Oct. 24, 2001 (FI) .............................................. 20012058

(51) Int. Cl.[7] ............................ B27L 5/02; B23Q 16/00

(52) U.S. Cl. ....................... 144/211; 144/212; 144/356; 144/365; 144/382

(58) Field of Search ............................. 144/209.1, 211, 144/212, 356, 357, 365, 382, 213

(56) References Cited

U.S. PATENT DOCUMENTS 4,753,278 A * 6/1988 Lorenzo ................. 144/212 X
5,967,208 A * 10/1999 Calvert ................... 144/211 X
6,470,931 B2 * 10/2002 Puranen .................. 144/212 X

* cited by examiner

*Primary Examiner*—W. Donald Bray
(74) *Attorney, Agent, or Firm*—Connolly Bove Lodge & Hutz LLP

(57) ABSTRACT

The invention relates to a knife assembly for a veneer lathe, the knife assembly comprising heads having mounted therebetween a knife beam and a nose bar beam, the beams respectively supporting a peeling knife and a solid nose bar. The knife assembly is turnable about an axis of rotation aligned parallel to the longitudinal axis of the peeling knife and the nose bar, whereby the angular position of the knife assembly relative to the lathe carriage heads is adapted to change about this axis of rotation in compliance with the progress of veneer peeling. In the knife assembly, the angular position of the nose bar relative to the peeling knife is adapted changeable during peeling in order to control the angle between the nose bar and the peeling knife.

3 Claims, 4 Drawing Sheets

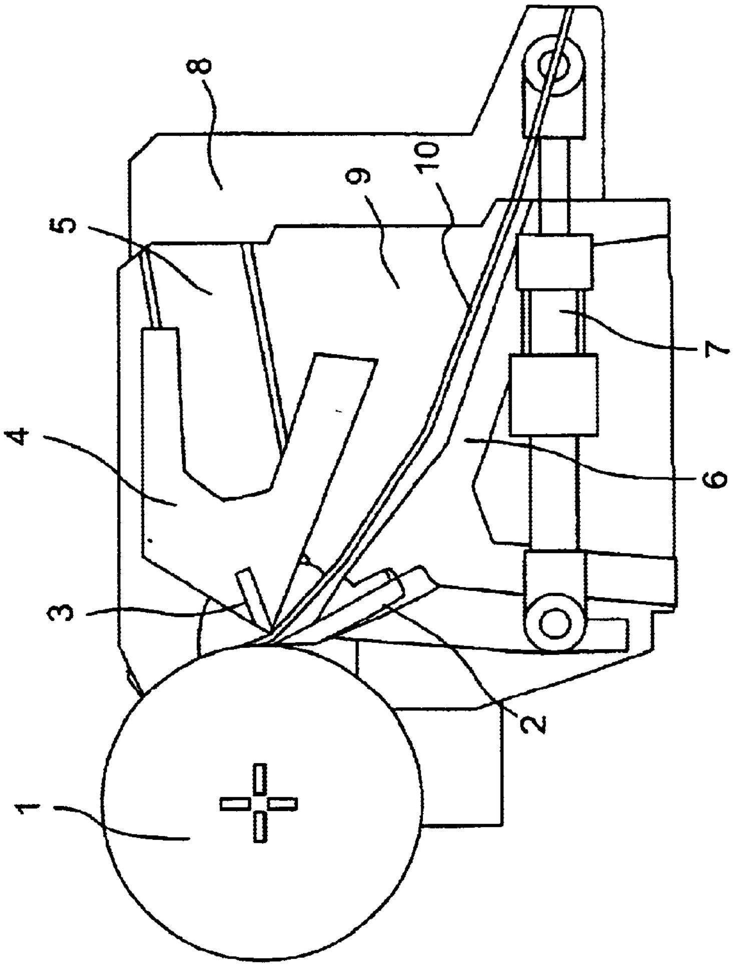
FIG. 1
CONVENTIONAL

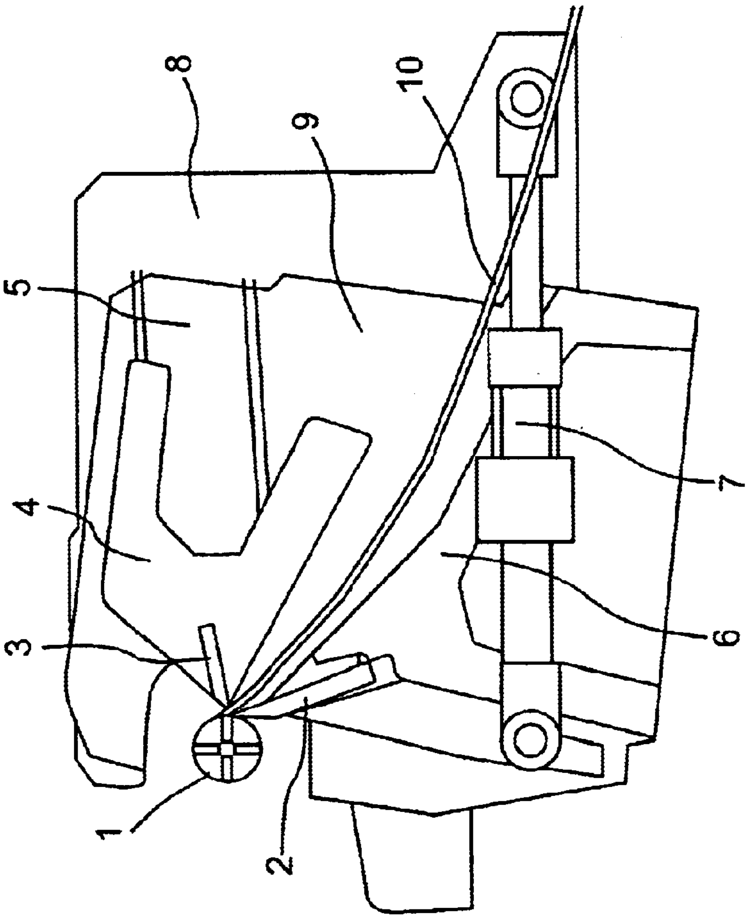
FIG. 2
CONVENTIONAL

KNIFE ASSEMBLY FOR A VENEER LATHE

The invention relates to a knife assembly of the knife carriage for a veneer lathe. The knife assembly comprises heads having mounted therebetween a knife beam and nose bar beam, these beams respectively supporting the peeling knife of the lathe and the nose bar backing the outer periphery of the log adjacent the point where the veneer will be separated during peeling. The combination of the knife and nose bar beams with the knife and nose supported thereby, and the heads form the knife assembly of the lathe.

Conventionally, the knife assembly is arranged to be movable, together a proper carriage on which the assembly is mounted, in a veneer lathe as an entity along a track in relation to the log being peeled in order to provide a feed movement of the knife assembly at a rate synchronized to the progress of peeling. Additionally, the position of the knife assembly, and thus also the peeling knife and the nose bar respectively is arranged controllable. Such a control facility is implemented by way of making the angular position of the knife assembly variable about an axis of rotation that is substantially parallel to the longitudinal axis of peeling knife and the nose bar. Generally, the term “substantially parallel” is in the art understood to mean perfect parallelism, but small variations therefrom are acceptable depending on the actual peeling situation. This type of angular position control of the knife assembly makes it possible to implement a correct alignment of the peeling knife in regard to the log during peeling. In this control arrangement, the peeling knife and the nose bar rotate as an entity in the knife assembly, whereby the mutual angular position between these knife assembly elements does not change.

It is further known in the art that the distance of the peeling knife from the nose bar, so-called knife gap; is adapted adjustable. Herein, the knife gap is set narrower than the nominal thickness of veneer to be peeled by a value called the degree of log compression. The degree of log compression defines the pressure force with which the nose bar running on the periphery of the log compresses the log surface radially inward immediately before the periphery of the log meets the cutting action of the peeling knife. The degree of log compression may be varied according to the progress of peeling through the different parts of the log. Obviously, the softer portion of the log may be peeled using a different degree of log compression than that required for the harder portion of the log. While the resilience of the log portion being peeled is dependent on the wood species, a general rule is that sapwood is softer than heartwood. However, veneer may also be peeled from wood species in which the situation is reversed. Hence, it is necessary to provide means for changing the degree of log compression according to the wood species or state of the log being peeled.

As known in the art, the nose bar may be either a so-called solid nose bar, whose backing surface glides on the periphery of the log being peeled, or a so-called roller nose bar that may be, e.g., a small-diameter roller arranged to roll along the log periphery. By varying the counterforce imposed by the nose bar, the quality of veneer obtained from peeling may be affected substantially.

In peeling using a solid nose bar, it has been found that a significant factor as to the quality of the veneer produced by the lathe is the face angle of the nose bar, which in the art is defined as the inclination of the beveled face of the nose bar from the vertical plane at the zero position of the lathe, i.e. at the position where the tip of the peeling knife in the knife assembly is exactly at the height of a horizontal plane aligned at the center axis of the lathe spindle, while the nose bar is respectively set into its operating position. It is further known that the bevel angle of the nose bar must be selected according to the wood species being peeled, whereby a smaller bevel angle is needed for softer wood species. Herein, the lathe is set for the wood species to be peeled by mounting thereon a nose bar having a bevel angle experimentally optimized for the intended peeling operation. In the art are also known arrangements that permit optimized setting of the angular position of the nose bar in the nose bar beam prior to starting peeling.

According to the present invention, the performance of a veneer lathe is improved by virtue of a knife assembly comprising a peeling knife and a solid nose bar with a continuous adjustment facility for setting the angular position of the nose bar relative to the peeling knife thus allowing the angle between the nose bar and the peeling knife to be changed during peeling. In the present construction, the angular position of the nose bar can be set and controlled independently from the angular position of the peeling knife.

Next, the invention will be examined in greater detail with the help of the attached drawings of an exemplifying embodiment, wherein FIG. 1 is a cross-sectional view of the knife assembly of a conventional veneer lathe with the knife assembly adjusted for the beginning of peeling;

FIG. 2 is a cross-sectional view of the knife assembly of the veneer lathe of FIG. 1 at the end of peeling;

Figure 3:
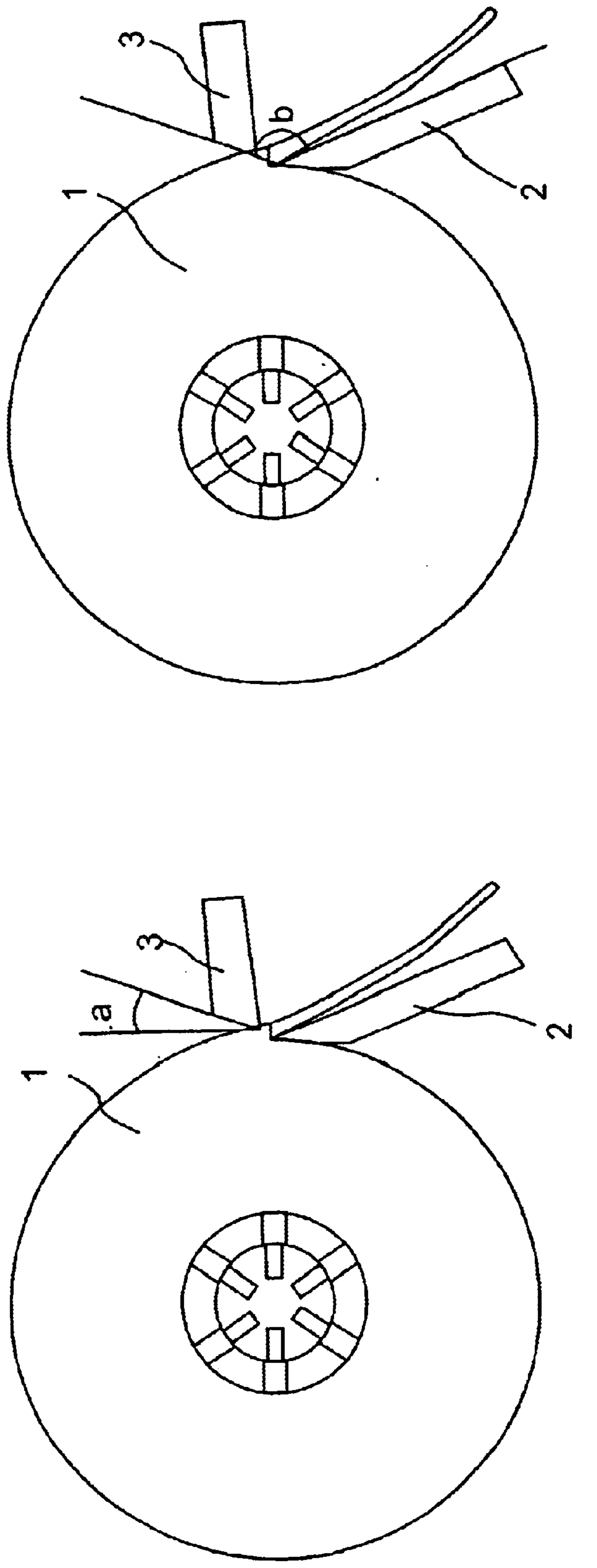
FIG. 3 is a pair of diagrammatic end views of a log supported by veneer lathe spindles with the peeling knife-nose bar unit at the so-called zero position of the lathe, illustrating the angles essential to the implementation of present invention.

Referring to the FIG. 1, therein is diagrammatically shown a conventional knife assembly of a veneer lathe with its knife assembly adapted about a log to be peeled in the beginning of peeling. The log 1 is arranged to rotate about its longitudinal center axis on spindles that are included in the lathe layout and are shown only diagrammatically. The knife assembly with the lathe heads 8 is as an entity movable toward the spindle center during peeling in synchronism with the progress of peeling, respectively, can be withdrawn outward from the spindle center axis for chucking a new log to be peeled. For knife carriage assembly movements, the lathe layout includes suitable pitch rails and controlled actuators to perform the movements. Inasmuch as these accessories are fully familiar to a person skilled in the art, their further discussion has been omitted herein.

The knife assembly, which is supported between the lathe carriage heads 8, comprises a knife beam 6 mounted on the assembly heads 9, a peeling knife 2 supported by the knife beam and a nose bar beam 4 that respectively supports a nose bar 3, and is mounted on the assembly heads 9. In the exemplifying embodiment described herein, the nose bar 3 is a so-called solid nose bar that during peeling presses the surface of the log 1 being peeled by a sliding compressive contact.

The nose bar beam 4 is adapted movable along guide rails 5 in regard to the knife beam 6. This facility is necessary to withdraw the nose bar and keep it clear of the log during the initial state of peeling when the log must be trued before actual peeling can be commenced. When peeling of veneer is actually started, nose bar 3 mounted on its support beam is brought to a proper gap distance from the peeling knife. Guide rails 5 control the movement of the nose bar beam 4 in regard to the knife beam so that the mutual angular position between knife 2 and nose bar 3 stays constant.

During the progress of peeling, the diameter of the log diminishes, whereby it becomes utterly important to see that the position of the peeling knife relative to the log being peeled is kept correct. To accomplish this function, the carriage of the veneer lathe is constructed such that knife assembly is pivotally rotatable on the carriage heads. The axis of rotation of the assembly is conventionally aligned parallel to the longitudinal axis of the knife and the nose bar. More specifically, the axis of knife rotation is made entirely or almost concentric with the axis of rotation of the log being peeled. In the present embodiment, the angular position of the knife assembly relative to the carriage heads 8 is controlled by an actuator 7, which in the diagrams is represented by an actuator cylinder. The angular position of the knife assembly in the beginning of peeling is illustrated in FIG. 1, while FIG. 2 shows the angular position of the knife assembly in the final stage of peeling. During this rotation of the knife assembly, the mutual angular position between the knife and nose bar of the knife assembly stays constant.

In FIG. 3 is shown diagrammatically the mutual disposition of the knife and nose bar relative to the log in the so-called zero position of peeling, which in a conventional veneer lathe represents the initial state of veneer peeling. The tip of the peeling knife 2 is assumed to be aligned at a horizontal plane passing through the spindle center (center of rotation of the log). Respectively, the nose bar 3 is actuated to press the surface of the log to be peeled, whereby the nose bar tip is situated at a set gap from the tip of the peeling knife. The nose bar face is sharpened to have a beveled surface that in the zero position forms with the vertical plane a face angle denoted by letter "a" in the diagram. The face angle "a" is selected by experimental techniques for each wood species individually, and its value typically falls in the range 15° to 25°. The zero position of the knife and nose bar relative to the log is shown in the right-side diagram of FIG. 3, wherein also the angle between the beveled face of the nose bar 3 and the back face of the peeling knife 2 is denoted by letter "b". During the peeling operation illustrated in FIGS. 1 and 2, this angle "b" stays constant. However, angle "a" increases with the rotation of the knife assembly during peeling as determined by the position adjustments of the peeling knife as is evident by comparing the peeling situations of FIGS. 1 and 2. Unfortunately, this condition does not provide optimal performance of the nose bar as is often evident in quality variations of peeled veneer, e.g., when the log properties are different in the sapwood and the heartwood.

This problem is overcome with a knife assembly, which features a facility of continuous adjustment of angle "b" of peeling knife 2 relative to nose bar 3 during peeling. This kind of knife assembly construction makes it possible to control the face angle "a" of the nose bar to a desired value during all phases of peeling. Accordingly, angle "a" may be set to stay at a constant value, increase with the progress of peeling, decrease with the progress of peeling or, alternatively, variably increase or decrease at different positions of the angular alignment of the peeling knife. Changes in angle "a" may be arranged to take place in a continuous fashion or incrementally in the form of small changes in the angle.

Angle "b" of the peeling knife 2 relative to the nose bar must have such an adjustment range that the nose bar face angle "a", which is a crucial control variable as to the outcome of peeling, can be set from about 5° to 30°. depending on the actual peeling situation. As mentioned in the foregoing, a general rule of thumb in regard to the setting of face angle "a" is that for softwood species the angle is set smaller than for hardwood species. Herein, the angle control facility provided by the invention makes it possible to take into account during peeling such factors as, e.g., change of wood hardness at different diameters of the log.

Figure 4:
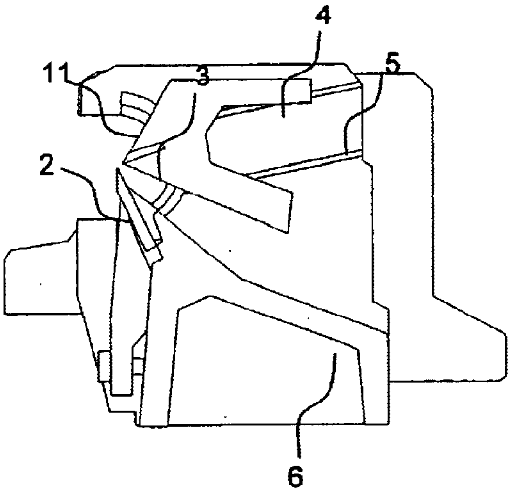
FIG. 4 is a cross-sectional view of the knife assembly of a veneer lathe with the knives of the knife assembly set in a first mutual position.
Figure 5:
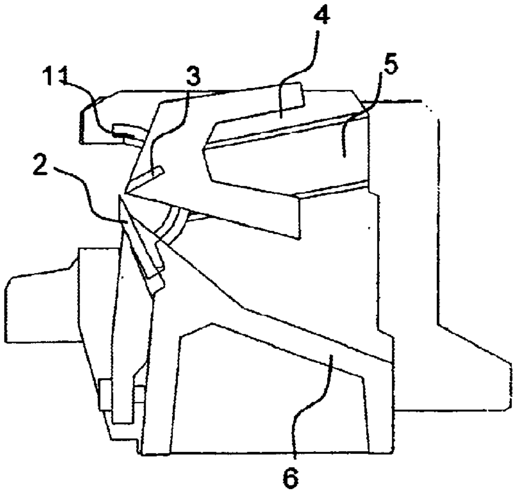
FIG. 5 is a cross-sectional view of the knife assembly of FIG. 4 with the knives set in a second mutual position.

A knife carriage equipped with an embodiment of the knife assembly according to the invention is shown in FIGS. 4 and 5. The essential feature of the illustrated knife assembly construction is that the angular position of the nose bar beam 4, whereon the nose bar 3 is mounted, is settable relative to the assembly head, and this irrespective of the angular position of the peeling knife beam. Resultingly, also angle "b" between the nose bar and the peeling knife is freely settable. The setting of the nose bar bean relative to the assembly head can be controlled during the whole peeling operation when necessary.

To implement the setting facility of angle "b", the heads of the assembly are provided with two-part segmentally annular bearings 11, wherein one part of the bearing supports the knife beam 6, while the other parts supports the nose bar beam 4. A number of equivalent constructions are feasible for realizing the independent control of the angular position of the nose bar beam 4 in the knife assembly, whereby the support point of the actuator used for effecting the control force may be located on the assembly head or the knife beam 4.

A corresponding function of the nose bar may be accomplished by means of a knife assembly construction, wherein the nose bar 3 mounted on the nose bar beam is made adjustable during peeling as to its angular position. To this end, the nose bar may be mounted on the nose bar beam with the help of multiple different arrangements allowing angular position control of the nose bar in regard to the position of the nose bar beam by various power actuators such as hydraulic cylinders, jack screws, wedged actuators and eccentric cam mechanisms. Notwithstanding such a control facility, the nose bar may still be categorized as a solid nose bar discussed above inasmuch as it is characterized by its sliding contact on the log periphery during peeling.

What is claimed is:

1. A knife assembly for a veneer lathe for peeling veneer from a log rotated in the lathe about an essentially central longitudinal axis of the log, wherein the lathe comprises means for advancing said knife assembly towards the essentially central longitudinal axis of the log in compliance with the progress of veneer peeling, wherein the knife assembly comprises:

assembly heads;

a knife beam mounted on said assembly heads, wherein said knife beam supports a peeling knife; and a nose bar beam mounted on said assembly heads, wherein said nose bar beam supports a solid nose bar, and wherein said assembly heads are able to be turned on the lathe in compliance with the progress of veneer peeling about an axis aligned parallel to the essentially central axis of the log; and means for controlling the turning position of the nose bar beam about said axis during the peeling operation irrespective of the turning position of the peeling knife beam.

2. A knife assembly for a veneer lathe for peeling veneer from a log rotated in the lathe about an essentially central longitudinal axis of the log, wherein the lathe comprises means for advancing said knife assembly towards the essentially central longitudinal axis of the log in compliance with the progress of veneer peeling, and wherein the knife assembly comprises:

assembly heads;

a knife beam mounted on said assembly heads, wherein said knife beam supports a peeling knife;

a nose bar beam mounted on said assembly heads, wherein said nose bar beam supports a solid nose bar, and wherein said assembly heads are able to be turned on the lathe in compliance with the progress of veneer peeling about an axis aligned parallel to the essentially central axis of the log; and means for controlling the turning position of the nose bar relative to the turning position of the nose bar beam about said axis during the peeling operation.

3. A knife assembly for a veneer lathe for peeling veneer from a log rotated in the lathe about an essentially central longitudinal axis of the log, wherein the lathe comprises means for advancing said knife assembly towards the essentially central longitudinal axis of the log in compliance with the progress of veneer peeling, and wherein the knife assembly comprises:

assembly heads;

a knife beam mounted on said assembly heads, wherein said knife beam supports a peeling knife;

a nose bar beam mounted on said assembly heads, wherein said nose bar beam supports a solid nose bar, and wherein said assembly heads are able to be turned on the lathe in compliance with the progress of veneer peeling about an axis aligned parallel to the essentially central axis of the log;

means for controlling the turning position of the nose bar beam about said axis during the peeling operation irrespective of the turning position of the peeling knife beam; and means for controlling the turning position of the nose bar relative to the turning position of the nose bar beam about said axis during the peeling operation.

* * * * *